US010650266B2

(12) United States Patent
Calcaterra et al.

(10) Patent No.: US 10,650,266 B2
(45) Date of Patent: *May 12, 2020

(54) IMAGE CATALOGER BASED ON GRIDDED COLOR HISTOGRAM ANALYSIS

(71) Applicant: INTERNATIONAL BUSINESS MACHINES CORPORATION, Armonk, NY (US)

(72) Inventors: Jeffrey A. Calcaterra, Chapel Hill, NC (US); Wei Ting Dong, Shanghai (CN); Shi Kun Li, Shanghai (CN); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,747

(22) Filed: Aug. 21, 2019

(65) Prior Publication Data

US 2019/0377968 A1 Dec. 12, 2019

Related U.S. Application Data

(63) Continuation of application No. 15/677,111, filed on Aug. 15, 2017.

(51) Int. Cl.
*G06K 9/46* (2006.01)
*H04N 1/60* (2006.01)
(Continued)

(52) U.S. Cl.
CPC ......... *G06K 9/4642* (2013.01); *G06F 16/435* (2019.01); *G06F 16/535* (2019.01);
(Continued)

(58) Field of Classification Search
CPC ...... G06K 9/4642; G06K 9/6212; G06T 7/90; G06T 2207/10024; G06F 16/435;
(Continued)

(56) References Cited

U.S. PATENT DOCUMENTS 5,579,471 A 11/1996 Barber et al.
6,647,141 B1 11/2003 Li
(Continued)

OTHER PUBLICATIONS

Google, "Similar Images graduates from Google Labs", Official Blog, Oct. 27, 2009, pp. 1-3.
(Continued)

*Primary Examiner* — Ali Bayat
(74) *Attorney, Agent, or Firm* — Richard A. Wilhelm

(57) ABSTRACT

Embodiments of the present invention disclose a method, computer program product, and system for cataloging images based on a gridded color histogram analysis. The computer accesses an image gallery specified by a user, wherein the image gallery is at least one of an image gallery stored on a user computing device, an image gallery stored on a user account at a third-party image storage, or an image gallery searched on the web. The computer receives a request to search the image gallery. The computer performs a search of the image gallery, wherein the search is using a color based histogram algorithm based on a user input. The computer transmits a cataloged and sorted image gallery to the user computing device to be displayed.

14 Claims, 10 Drawing Sheets

(51) Int. Cl.
  *G06T 7/90* (2017.01)
  *G06F 16/435* (2019.01)
  *G06F 16/583* (2019.01)
  *H04N 1/407* (2006.01)
  *G06F 16/535* (2019.01)

(52) U.S. Cl.
  CPC ....... *G06F 16/5838* (2019.01); *G06K 9/4652* (2013.01); *G06T 7/90* (2017.01); *H04N 1/4074* (2013.01); *H04N 1/6027* (2013.01); *H04N 1/6063* (2013.01); *H04N 1/6075* (2013.01); *G06T 2207/10024* (2013.01)

(58) Field of Classification Search
  CPC ............. G06F 16/5838; G06F 16/5866; G06F 16/9032; G06F 16/73
  USPC ........................................................ 382/284
  See application file for complete search history.

(56) References Cited

U.S. PATENT DOCUMENTS

| | | | | |
|---|---|---|---|---|
| 7,139,767 | B1* | 11/2006 | Taylor | G06F 16/50 |
| 7,840,066 | B1* | 11/2010 | Chen | G06T 5/002 |
| | | | | 382/168 |
| 8,131,066 | B2 | 3/2012 | Hua et al. | |
| 8,199,979 | B2 | 6/2012 | Steinberg et al. | |
| 8,732,161 | B2 | 5/2014 | Jain et al. | |
| 8,891,902 | B2 | 11/2014 | Chin et al. | |
| 9,008,435 | B2 | 4/2015 | Gokturk et al. | |
| 9,069,795 | B2 | 6/2015 | Atsmon et al. | |
| 9,235,859 | B2 | 1/2016 | Bhardwaj et al. | |
| 2001/0017940 | A1 | 8/2001 | Kim et al. | |
| 2003/0016250 | A1* | 1/2003 | Chang | G06F 16/532 |
| | | | | 715/810 |
| 2003/0050923 | A1* | 3/2003 | Chang | G06F 16/9032 |
| 2003/0086496 | A1* | 5/2003 | Zhang | G06K 9/00711 |
| | | | | 375/240.16 |
| 2004/0240731 | A1 | 12/2004 | Kim et al. | |
| 2009/0281925 | A1 | 11/2009 | Winter et al. | |
| 2013/0084001 | A1 | 4/2013 | Bhardwaj et al. | |
| 2013/0249934 | A1 | 9/2013 | Gershon et al. | |
| 2014/0254927 | A1 | 9/2014 | Bhardwaj et al. | |
| 2014/0270498 | A1* | 9/2014 | Chester | G06K 9/4652 |
| | | | | 382/162 |
| 2015/0142732 | A1* | 5/2015 | Pace | G06F 16/5838 |
| | | | | 707/609 |
| 2017/0322951 | A1 | 11/2017 | Chittar et al. | |
| 2019/0057279 | A1 | 2/2019 | Calcaterra | |

OTHER PUBLICATIONS

Schwartz, "Find Similar Images Now in Google Image Search", Oct. 28, 2009, pp. 1-5.
Creativetechs, "Google Labs releases Similar Images Search", printed on Jun. 27, 2017, pp. 1-4, https://www.creativetechs.com/google-labs-releases-similar-images-search/.
Google, Search, "Car", printed on Jun. 27, 2017, pp. 1-4, https://www.google.com/search?tbm=isch&q=car&chips=q:car.
Cho et al.,"A Human-Oriented Image Retrieval System Using Interactive Genetic Algorithm", IEEE Transactions on Systems, Man, and Cybernetics, Part A: Systems and Humans, vol. 32, No. 3, May 2002, pp. 452-458.
Wikipedia, the free encyclopedia, "Color histogram", printed on Jun. 22, 2017, pp. 1-8.
Etsy, Search "Cow", printed Jun. 27, 2017, pp. 1-64, https://www.etsy.com/search/clothing?q=cow&order=most_relevant&vi.
Murphy, "Deep Learning Frameworks: A Survey of TensorFlow, Torch, Theano, Caffe, Neon, and the IBM Machine Learning Stack", Microway.com, HPC Tech Tips, Jan. 13, 2016, pp. 1-8.
Haldar et al., "Content based Image Retrieval using Histogram, Color and Edge", International Journal of Computer Applications (0975-888), vol. 48, No. 11, Jun. 2012, pp. 25-31.
Niblack et al., "SlideFinder: A Tool for Browsing Presentation Graphics Using Content-Based Retrieval", Published in Content-Based Access of Image and Video Libraries, 1999, (CBAIVL '99), Date of Conference: Jun. 22, 1999, pp. 1-5.
Sclaroff et al., "ImageRover: A Content-Based Image Browser for the World Wide Web", 1997 IEEE, pp. 2-9.
Smith et al., "Visually Searching the Web for Content", Feature Article, Jul.-Sep. 1997 IEEE MultiMedia, pp. 12-20.
Tineye Labs, "Multicolr Search Lab", printed Jun. 27, 2017, pp. 1-2, http://labs.tineye.com/multicolr.
Tineye, "Reverse Image Search", printed Jun. 27, 2017, pp. 1-2, https://tineye.com/.
Terragalleria, "The Photography of QT Luong", Travel, landscape and nature pictures, Last site update: Jun. 9, 2017, pp. 1-3.
Tiltomo, "A Images, Stock Images, Stock Photos Images, A Game Online Games", 2017, p. 1, http://www.tiltomo.com/.
Wikipedia, the free encyclopedia, "HSL and HSV", printed on Jul. 13, 2017, pp. 1-27.
Wikipedia, the free encyclopedia, "Grayscale", printed on Jul. 13, 2017, pp. 1-5.
Wikipedia, the free encyclopedia, "RBG color space", printed on Jul. 13, 2017, pp. 1-4.
Mell et al., "The NIST Definition of Cloud Computing", Recommendations of the National Institute of Standards and Technology, NIST Special Publication 800-145, Sep. 2011, 7 pages.
IBM, List of IBM Patents or Patent Applications Treated as Related, Appendix P, dated Nov. 14, 2019, 2 pages.

\* cited by examiner

IMAGE CATALOGER BASED ON GRIDDED COLOR HISTOGRAM ANALYSIS

BACKGROUND

The present invention relates generally to the field of cataloging images, and more particularly to cataloging images based on a gridded color histogram analysis.

Cataloging, sorting, and laying out images are key features for supporting image processing operations. There are many ways to classify images based on content, event, keyword, color, and location. A new area is a reverse image search using color histograms that focus on the entire image. However, people need to be able to sort images according to certain colors that appear in a designated portion of the image.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for cataloging images based on a gridded color histogram analysis. The computer accesses an image gallery specified by a user, wherein the image gallery is at least one of an image gallery stored on a user computing device, an image gallery stored on a user account at a third-party image storage, or an image gallery searched on the web. The computer receives a request to search the image gallery specified by the user. The computer performs a search of the image gallery, wherein the search is using a color based histogram algorithm based on a user input. The computer transmits a cataloged and sorted image gallery to the user computing device to be displayed.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
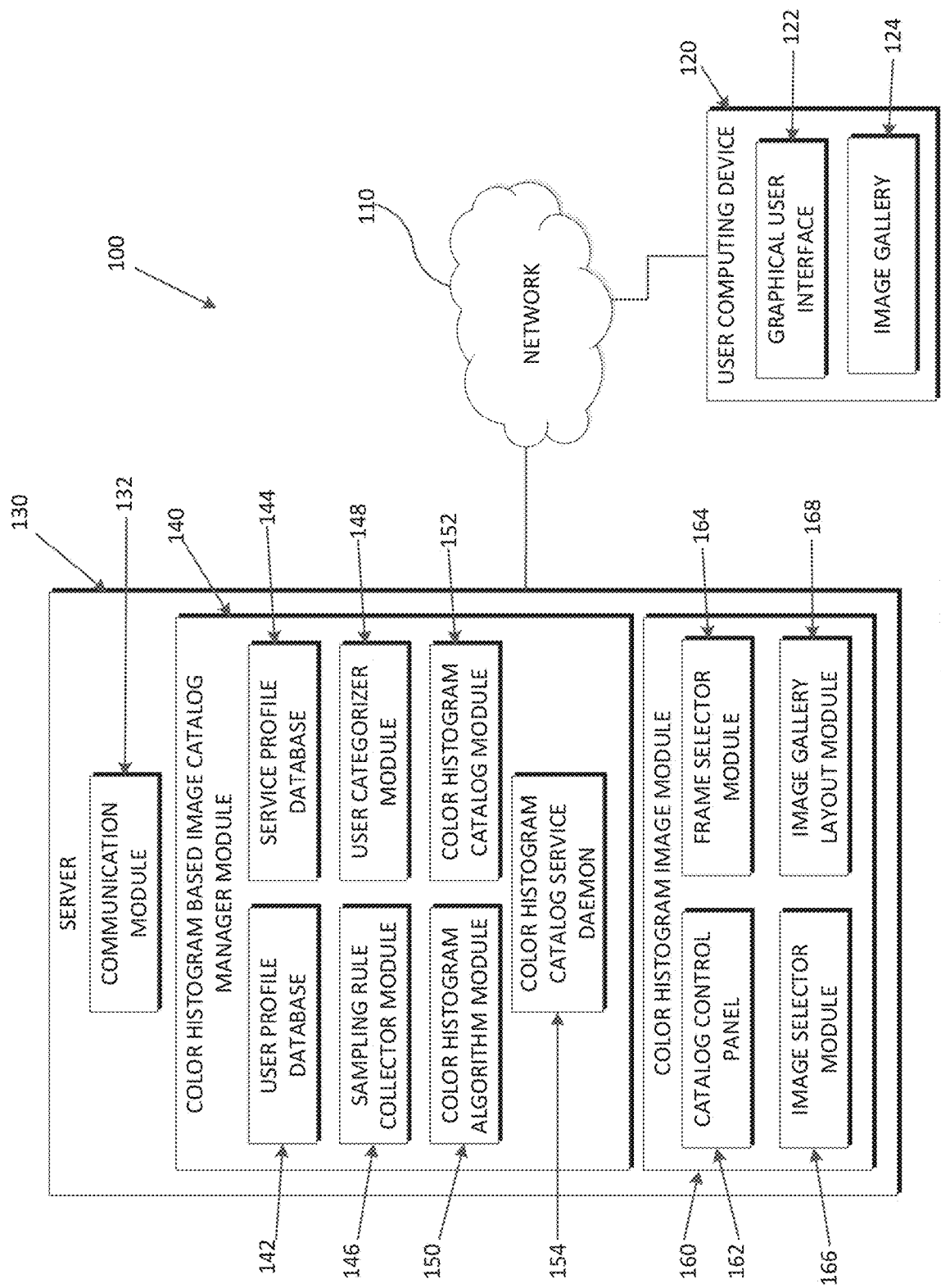
FIG. 1 is a functional block diagram illustrating the system for cataloging images based on a gridded color histogram analysis, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Embodiments of the invention are generally directed to a system for cataloging images based on a gridded color histogram analysis. The system for cataloging images based on a gridded color histogram analysis can be a standalone application for searching an image gallery stored on a user computing device and/or it can be a separate application that a user can assess an image gallery stored on a user account at a third party image storage, or an image gallery searched on the web. The user creates a profile where personal characteristics are uploaded and previous searches are saved. The user is able to establish sampling rules or is able to choose from predetermined sampling rules. The user can customize the frame size for the cataloging image selection. The user can perform a search of an image gallery by either of the following methods. The user can select a region on a gridded template and then select a color combination from a color selection panel which is to be searched in the selected region for all of the images in the gallery. The user to select certain colors that appear only in a designated portion or the region (e.g. selected frame) of an image to search images and sorting images accordingly. The user can also select a specific color from a sample image and the image gallery can be searched for all images that contain that specific color in the same region as the sample image. A color based histogram algorithm is performed on the image gallery based on the method of the search. Gridded color histogram information is extracted from each of the images in the gallery. The pixels in the selected region with the specific color are averaged. The images in the gallery or on the cloud are analyzed for a similarity of color in the specified region. A color histogram catalog sorted by similarity is created as a result of the algorithm. The catalog is transmitted to the user.

FIG. 1 is a functional block diagram illustrating a system for cataloging images based on a gridded color histogram analysis 100, in accordance with an embodiment of the present invention.

The system for cataloging images based on a gridded color histogram analysis 100 includes a user computing device 120 and a server 130. The user computing device 120 and the server 130 are able to communicate with each other, via a network 110.

The network 110 can be, for example, a local area network (LAN), a wide area network (WAN) such as the Internet, or a combination of the two, and can include wired, wireless, or fiber optic connections. In general, the network 110 can be any combination of connections and protocols that will support communications between the user computing device 120 and the server 130, in accordance with one or more embodiments of the invention.

The user computing device 120 may be any type of computing device that is capable of connecting to the network 110, for example, a laptop computer, tablet computer, netbook computer, personal computer (PC), a desktop computer, a smart phone, or any programmable electronic device supporting the functionality required by one or more embodiments of the invention. The user computing device 120 may include internal and external hardware components, as described in further detail below with respect to FIGS. 7 or 8. In other embodiments, the user computing device 120 may operate in a cloud computing environment, as described in further detail below with respect to FIGS. 9 and 10.

The user computing device 120 represents a computing device that includes a user interface, for example, a graphical user interface 122. The graphical user interface 122 can be any type of application that contains an interface to perform a gridded color histogram image search via a color histogram image module 160 and receive and display the cataloged results from a color histogram based image catalog manager module 140.

The user computing device 120 includes an image gallery 124 that could be the user's personal image gallery. For simplicity, the image gallery 124 is shown as a part of the user computing device 120. However, it can be a separate application hosted on the server 130 that the user can access to search online galleries, or search images on the cloud or the internet.

The server 130 includes a communication module 132, the color histogram based image catalog manager module 140, and the color histogram image module 160. For simplicity, the color histogram image module 160 and the color histogram based image catalog manager module 140 are shown as a part of the server 130. However, the color histogram image module 160 and/or the color histogram based image catalog manager module 140 can be a stand-alone application on the user computing device 120. The server 130 is able to communicate with the user computing device 120, via the network 110. The server 130 may include internal and external hardware components, as depicted and described in further detail below with reference to FIG. 8. In other embodiments, the server 130 may include internal and external hardware components, as depicted and described in further detail below with respect to FIG. 9, and operate in a cloud computing environment, as depicted in FIG. 10.

The communication module 132 is capable of receiving a gridded color histogram image search from the color histogram image module 160 and transmitting the cataloged results from a color histogram based image catalog manager module 140 to the user computing device 120, via the network 110.

The color histogram based image catalog manager module 140 incudes a user profile database 142, a service profile database 144, a sampling rule collector module 146, a user categorizer module 148, a color histogram algorithm module 150, a color histogram catalog module 152, and a color histogram catalog service daemon 154.

The user profile database 142 and the service profile database 144 are data stores that store previously obtained data. The user profile database 142 stores color histogram sampling rules chosen or created by the user from the sampling rule collector module 146. The user profile database 142 also stores cataloged image galleries from the color histogram catalog module 152. The user specific data stored in the user profile database 142 provides for transparent searches that are geared toward the specific user. The user profile database 142 transmits the user's profile to the user categorizer module 148. The service profile database 144 stores color histogram sampling rules that are predefined by the service provider from the sampling rule collector module 146.

The sampling rule collector module 146 collects all of the sampling rules from the user's and the service providers for customization and optimization of the searches. For example, a sampling rule could be to focus on certain objects, ignore certain objects, filter out a certain color, assign a different weight to certain red, green, or blue color, and/or any customized rule. The sampling rule collector module 146 retrieves sampling rules made by the user from the color histogram catalog service daemon 154 and then transmits them to the user profile database 142 to be stored. The sampling rule collector module 146 obtains the predetermined sampling rules from the service providers and then transmits them to the service profile database 144.

The user categorizer module 148 categorizes user groups according to their user personal characteristics stored in the user profile database 142. The user categorizer module 148 categorizes users into user groups based on similar sampling rules and similar searches of the image gallery 124. This allows for optimization of searches for returning users. The user categorizer module 148 retrieves user information from the user profile database 142 to perform more personal searches, which remember the user's past search inputs and sampling rules. The user categorizer module 148 transmits the user's profile to a catalog control panel 162 so it remembers the user's information.

The color histogram algorithm module 150 provides operations to digitize the distribution of colors pixels in images based on the given sampling rules and frame selector. The color histogram algorithm module 150 retrieves the user chosen sampling rules from the sampling rule collector module 146 and retrieves the frame selection from the color histogram catalog service daemon 154. The color histogram algorithm module 150 is granted access to the image gallery 124. The color histogram algorithm module 150 calculates and extracts gridded color histogram information from the image of the image gallery 124. The color histogram algorithm module 150 performs its calculations based on which method the user chooses to search the image gallery 124. The user can select a region on a gridded template and then select a color combination from a color selection panel which is to be searched in the selected region for all of the images in the image gallery 124. The user to select certain colors that appear only in a designated portion or a region (e.g. selected frame) of an image to search images and sorting images accordingly. The user can also select a specific color from a sample image and the image gallery 124 can be searched for all images that contain that specific color in the same region as the sample image. The color histogram algorithm module 150 retrieves the method that the user took for the search from the color histogram catalog service daemon 154. The color histogram algorithm module 150 averages the pixels in the specified region with the specified color based on the user's search. The color histogram algorithm module 150 then analyzes the images in the image gallery 124 being searched for similarities in color in the specified region. The color histogram algorithm module 150 sorts the images based on those with the most similarities. The color histogram algorithm module 150 transmits the sorted similar images to the color histogram catalog module 152 to be cataloged.

The color histogram catalog module 152 retrieves the similar images from the color histogram algorithm module 150 to catalog them based on their similarities. The color histogram catalog module 152 transmits the catalog to an image gallery layout module 168 to be displayed on the user computing device 120, via the graphical user interface 122. The color histogram catalog module 152 also transmits the cataloged image gallery to the user profile database 142 to be stored for future searches.

The color histogram catalog service daemon 154 receives the user search from an image selector module 166. The color histogram catalog service daemon 154 is granted access to the image gallery 124 being searched. The color histogram catalog service daemon 154 receives the sampling rules from the catalog control panel 162. The color histogram catalog service daemon 154 receives the user's frame selection from a frame selector module 164. The color histogram catalog service daemon 154 transmits the sample rules from the catalog control panel 162 to the sampling rule collector module 146. The color histogram catalog service daemon 154 transmits the frame selection from the frame selector module 164 and the user search and the image gallery 124 from the image selector module 166 to the color histogram algorithm module 150.

The color histogram image module 160 includes the catalog control panel 162, the frame selector module 164, the image selector module 166, and the image gallery layout module 168.

The catalog control panel 162 is where the user can select predetermined sampling rules from the service providers or can write their own sampling rules. The catalog control panel 162 transmits the user's sampling rules and the user's profile to the color histogram catalog service daemon 154. The catalog control panel 162 receives the user's personal characteristics and profile from the user categorizer module 148 so it remembers the user's information.

The frame selector module 164 allows the user to select the frame size to search within the image gallery 124. The frame selector module 164 allows the user to select the grid size, for example 4×4, 8×8, or uneven frames. This allows for easy region selection in the image selector module 166. The frame selector module 164 transmits the user's frame selection to the color histogram catalog service daemon 154 and the image selector module 166.

The image selector module 166 allows the user to search the image gallery 124 based on two different methods. The user can select a region on a gridded template and then select a color combination from a color selection panel which is to be searched in the selected region for all of the images in the image gallery 124. The user can also select a specific color from a sample image and the image gallery 124 can be searched for all images that contain that specific color in the same region as the sample image. The sample image is from the image gallery 124, for example the sample image can be from the user's personal image gallery, from a search on the World Wide Web, or an image gallery stored on a user account at a third-party image storage. The image selector module 166 retrieves the user's frame selection form the frame selector module 164 for accessibility when selecting the specific region on the template or sample image. The image selector module 166 transmits the user's search to the color histogram catalog service daemon 154.

The image gallery layout module 168 receives the cataloged image gallery based on the similarities to the user's search from the color histogram catalog module 152. The most similar images are presented first in the cataloged image gallery. The graphical user interface 122 displays the cataloged images from the image gallery layout module 168 for the user.

Figure 2:
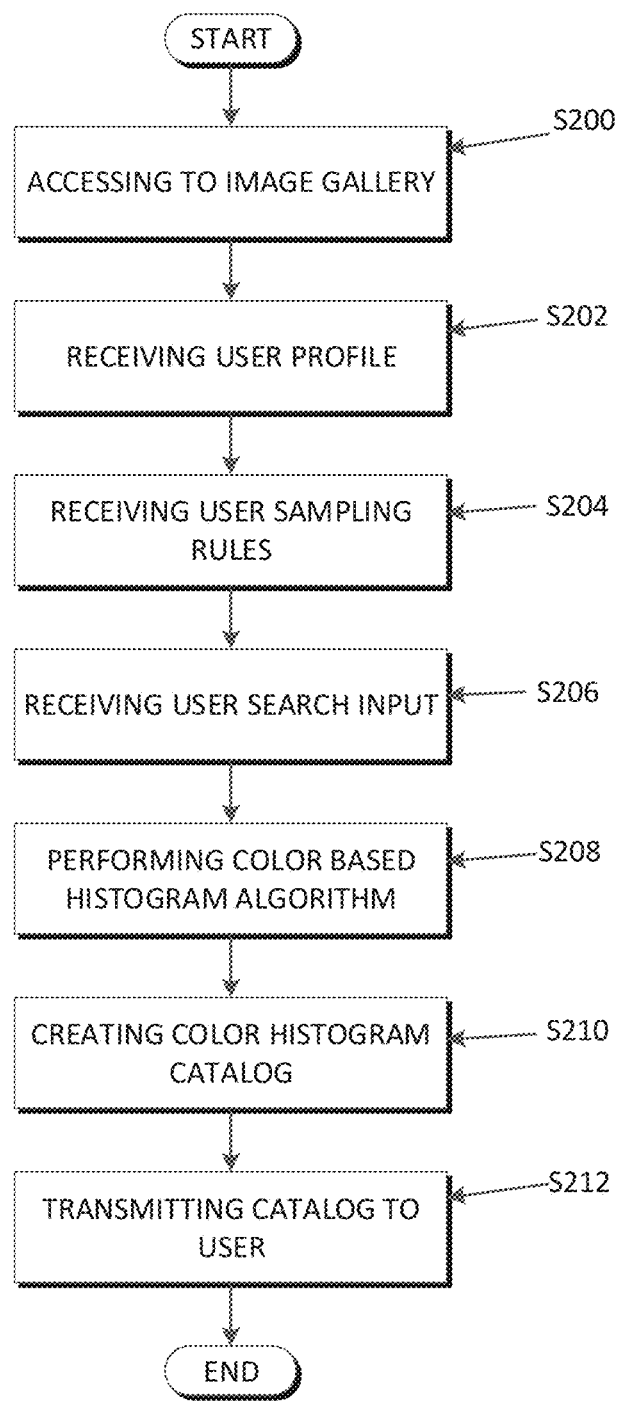
FIG. 2 is a flowchart depicting operational steps to catalog images based on the gridded color histogram analysis within the environment of FIG. 1, in accordance with an embodiment of the present invention.

FIG. 2 represents the color histogram based image catalog manager module 140 cataloging images based on the user's search.

FIG. 2 illustrates the color histogram catalog service daemon 154 receiving the user's search and the color histogram algorithm module 150 searching for similar images to be cataloged. The color histogram catalog service daemon 154 is accessing the image gallery 124 (S200). The color histogram catalog service daemon 154 receives the user's profile characteristics from the catalog control panel 162 (S202). The color histogram catalog service daemon 154 receives the user's sampling rules from the catalog control panel 162 (S204). The color histogram catalog service daemon 154 receives the user's search input from the image selector module 166 (S206). The color histogram algorithm module 150 performs the color based histogram algorithm on the user's search and the image gallery 124 from the color histogram catalog service daemon 154 (S208). The color histogram catalog module 152 creates a color histogram catalog based on the results of the color histogram algorithm module 150 (S210). The color histogram catalog from the color histogram algorithm module 150 is transmitted to the image gallery layout module 168 (S212).

Figure 3:
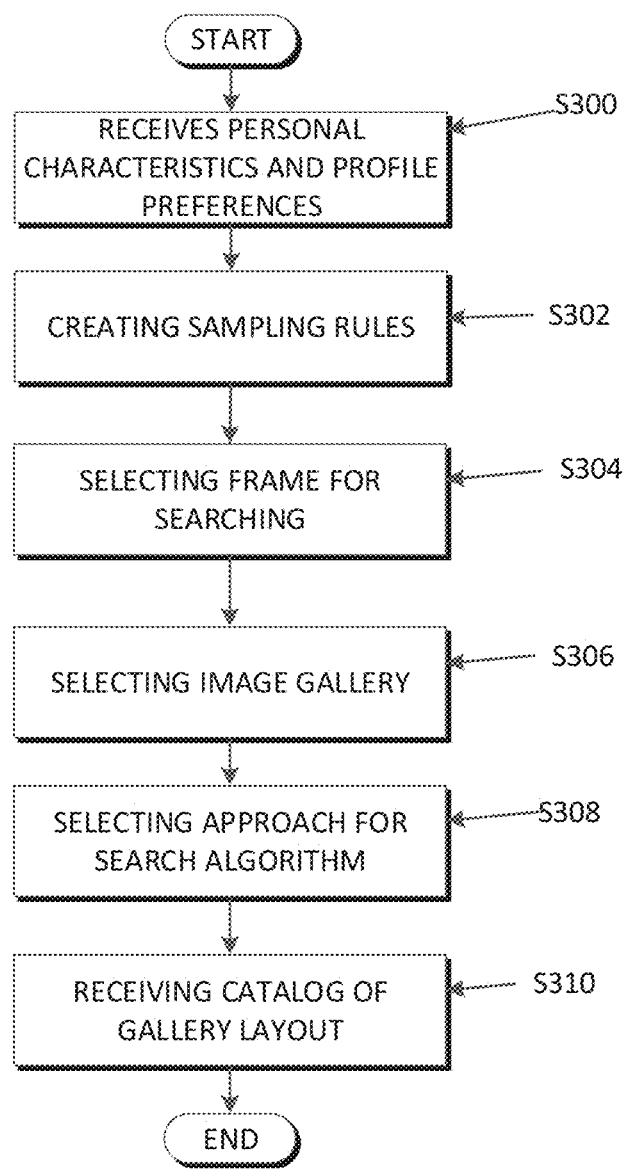
FIG. 3 is a flowchart depicting operational steps of the user searching an image gallery and receiving a cataloged result within the environment of FIG. 1, in accordance with an embodiment of the present invention.

FIG. 3 represents the user searching the image gallery 124 and receiving a cataloged gallery on the image gallery layout module 168.

FIG. 3 illustrates the user performing an image search on the color histogram image module 160 and receiving the cataloged result on the image gallery layout module 168. The catalog control panel 162 receives person characteristics and profile preferences from the user categorizer module 148 (S300). The user creates sampling rules or choose from predetermined sampling rules in the catalog control panel 162 (S302). The user selects a frame size for searching images in the frame selector module 164 (S304). The user selects the image gallery 124 to be searched, wherein the user will search their personal gallery when the color histogram image module 160 is a standalone application or the user will search a gallery on the cloud or on the web when the color histogram image module 160 is a part of the server 130 (S306). The user selects an approach for the search algorithm in the image selector module 166 (S308). The user can select a region on a gridded template and then select a color combination from a color selection panel which is to be searched in the selected region for all of the images in the image gallery 124. The user can also select a specific color from a sample image and the image gallery 124 can be searched for all images that contain that specific color in the same region as the sample image. The user receives the cataloged image gallery based on the search in the image gallery layout module 168 (S310).

Figure 4:
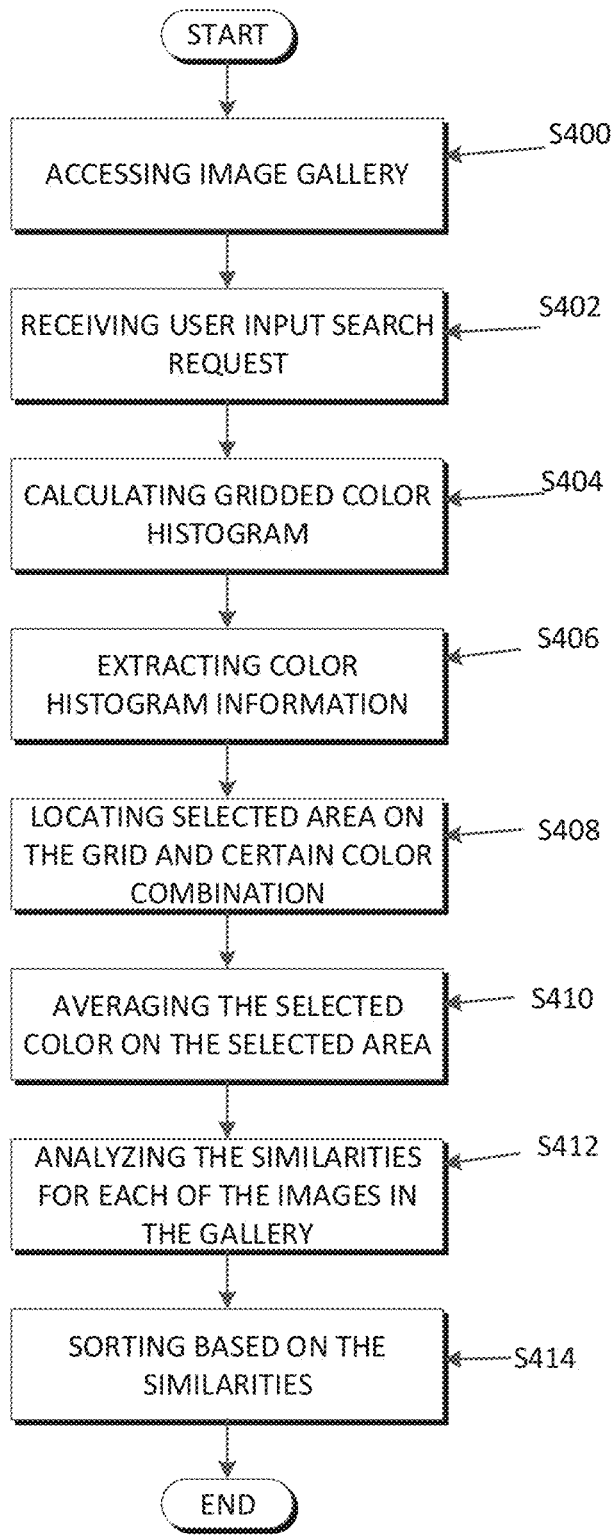
FIG. 4 is a flowchart depicting operation steps for a method of the color histogram algorithm within the environment of FIG. 1, in accordance with an embodiment of the present invention.

FIG. 4 represents an approach the color histogram algorithm module 150 can use to perform a search.

FIG. 4 illustrates one approach of the color histogram algorithm module 150. The color histogram algorithm module 150 accesses the image gallery 124 (S400). The color histogram algorithm module 150 receives the user input search request from the color histogram catalog service daemon 154 (S402). The color histogram algorithm module 150 calculates the gridded color histogram of the images in the image gallery 124 (S404). The color histogram algorithm module 150 extracts the color histogram information from the images in the image gallery 124 (S406). The color histogram algorithm module 150 locates the region on the grid and the certain color combination selected by the user (S408). The color histogram algorithm module 150 averages the pixels of the selected color on the selected region (S410). The color histogram algorithm module 150 analyzes the similarities for each of the images in the image gallery 124 (S412). The color histogram algorithm module 150 sorts the images in the gallery based on the similarities (S414).

Figure 5:
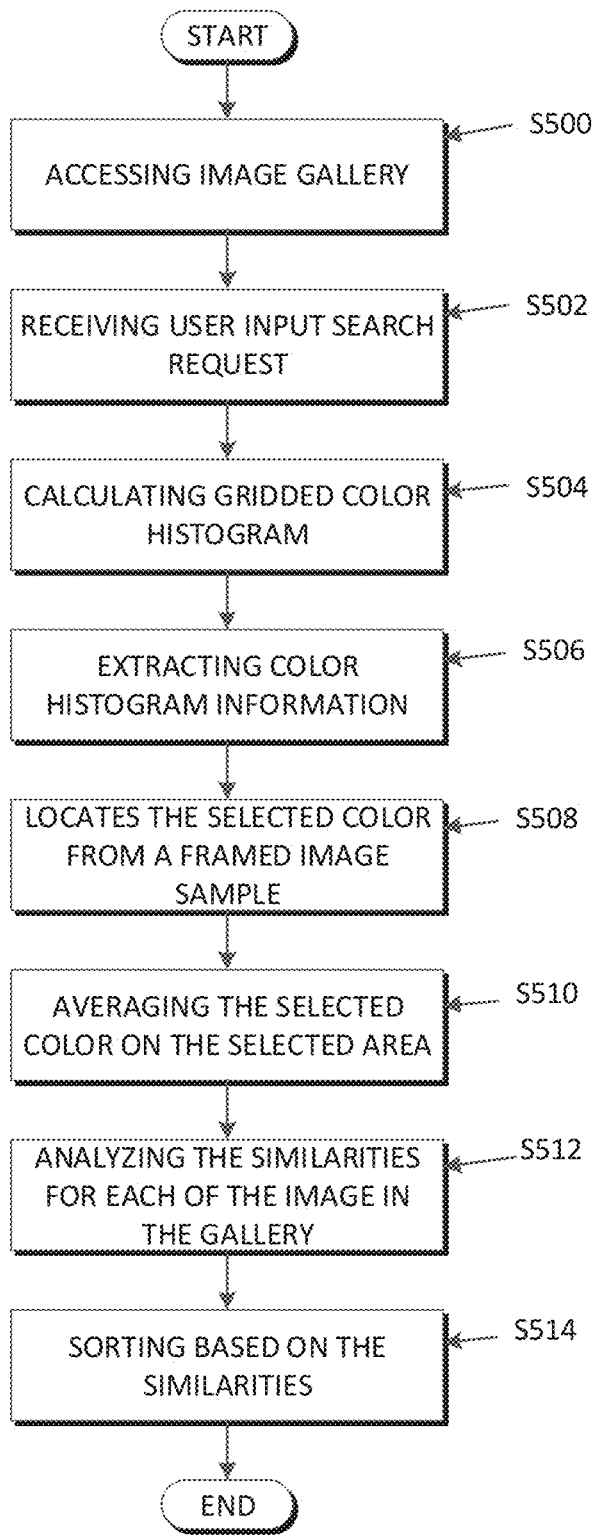
FIG. 5 is a flowchart depicting operation steps for another method of the color histogram algorithm within the environment of FIG. 1, in accordance with an embodiment of the present invention.

FIG. 5 represents another approach the color histogram algorithm module 150 can use to perform a search.

FIG. 5 illustrates another approach of the color histogram algorithm module 150. The color histogram algorithm module 150 accesses the image gallery 124 (S500). The color histogram algorithm module 150 receives the user input search request from the color histogram catalog service daemon 154 (S502). The color histogram algorithm module 150 calculates the gridded color histogram of the images in the image gallery 124 (S504). The color histogram algorithm module 150 extracts the color histogram information from the images in the image gallery 124 (S506). The color histogram algorithm module 150 locates the selected color from a framed image sample that was selected by the user (S508). The color histogram algorithm module 150 averages the pixels of the selected color on the selected region (S510). The color histogram algorithm module 150 analyzes the similarities for each of the images in the image gallery 124 (S512). The color histogram algorithm module 150 sorts the images in the gallery based on the similarities (S514).

Figure 6:
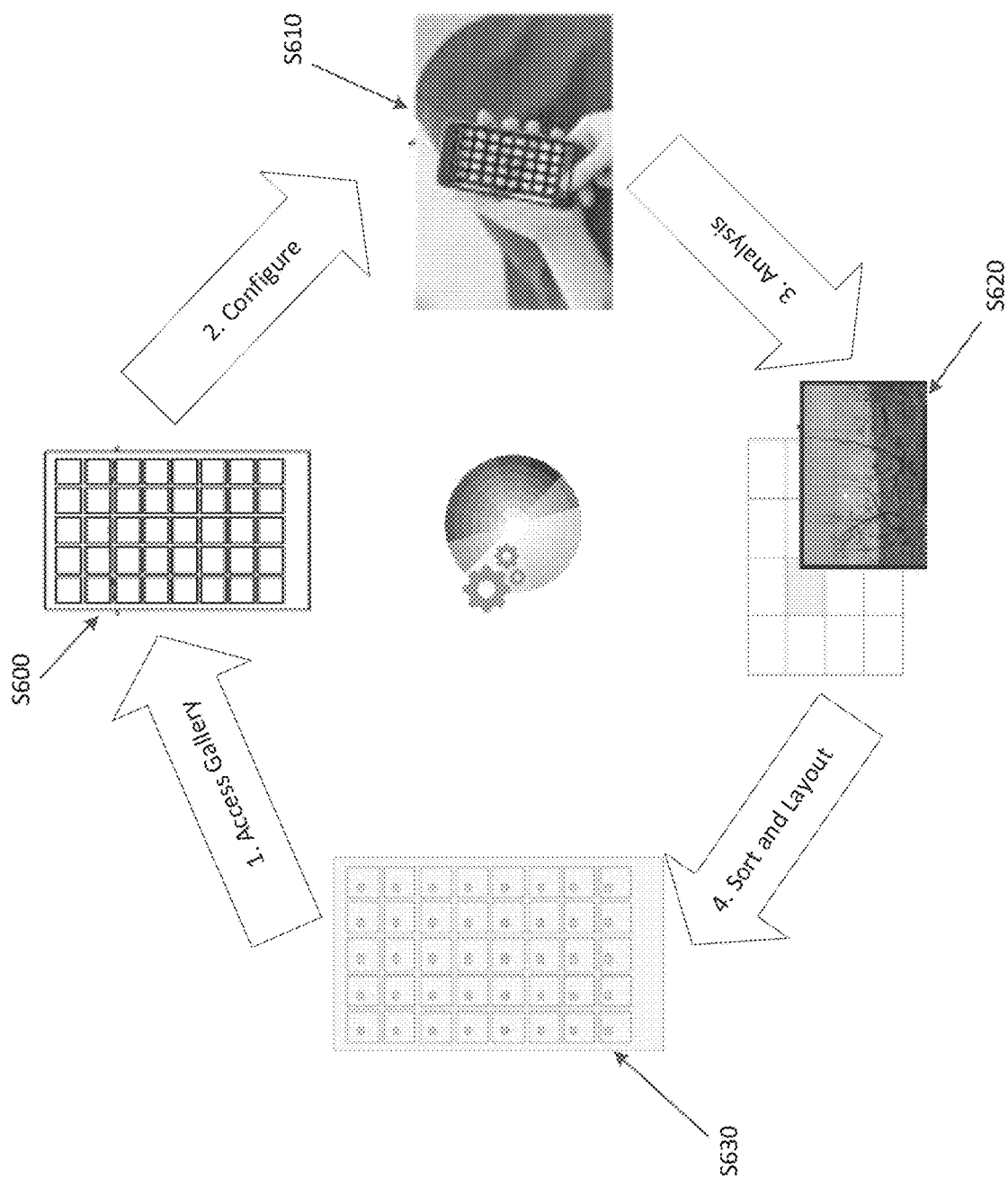
FIG. 6 illustrates an example of the color histogram based image catalog service, where the present invention can be implemented.

FIG. 6 represents an example of the color histogram based image catalog service.

FIG. 6 illustrates an example of the color histogram based image catalog service being implemented. The color histogram based image catalog manager module 140 and the color histogram image module 160 access the image gallery 124 (S600). The user configures all of the settings and sampling rules on their user computing device 120 through the color histogram image module 160 (S610). The color histogram algorithm module does an analysis of the user's search (S620). The color histogram catalog module 152 sorts the images based on the color histogram algorithm module 150 results and the image gallery layout module 168 displays the catalog for the user, via the graphical user interface 122 on the user computing device 120 (S630).

Figure 7:
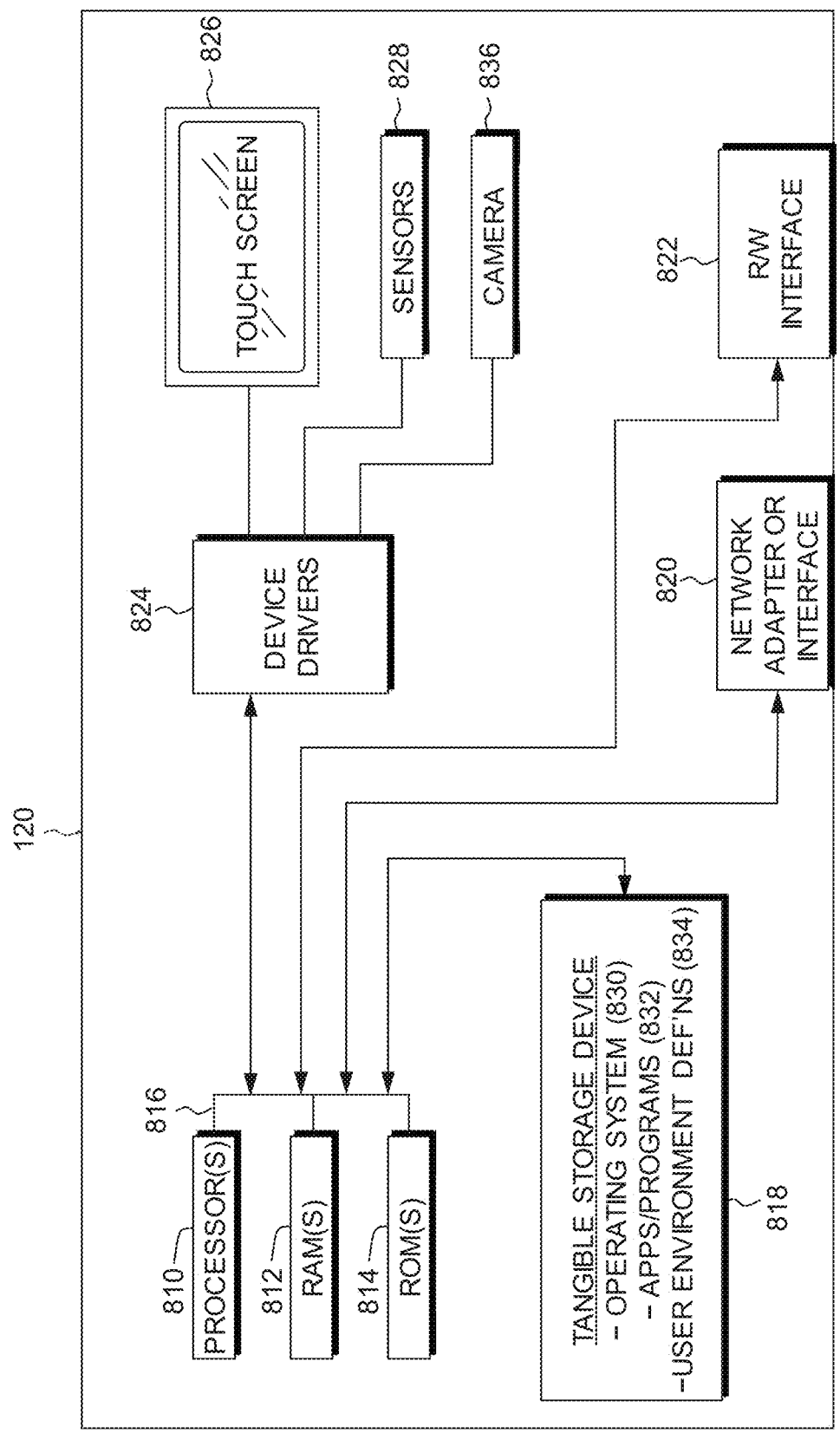
FIG. 7 is a block diagram of components of a mobile device of the system for cataloging images based on a gridded color histogram analysis of FIG. 1, in accordance with embodiments of the present invention.

FIG. 7 is a block diagram of components of the user computing device 120 for invoking a user environment based on a device cover, in accordance with an embodiment of the present invention. In an exemplary embodiment, the user computing device 120 includes one or more processors 810, one or more computer-readable RAMs 812, one or more computer-readable ROMs 814, and one or more computer-readable tangible storage devices 818 on one or more buses 816. One or more operating systems 830, one or more apps or programs 832, and one or more user environment definitions 834 are stored on the one or more computer-readable tangible storage devices 818 for execution by one or more of the processors 810 via one or more of the RAMs 812 (which typically include cache memory). In the illustrated embodiment, each of the computer-readable tangible storage devices 818 is a semiconductor storage device such as ROM 814, EPROM, flash memory or any other computer-readable tangible storage device that can store a computer program and digital information. Alternatively, each of the computer-readable tangible storage devices 818 is a magnetic disk storage device of an internal hard drive.

The user computing device 120 also includes a read/write (R/W) interface 822, for example, a USB port, to read from and write to external computing devices or one or more portable computer-readable tangible storage devices such as a CD-ROM, DVD, memory stick, magnetic disk, optical disk or semiconductor storage device. The apps and programs 832 and the user environment definitions 834 can be stored on the external computing devices or one or more of the portable computer-readable tangible storage devices, read via the R/W interface 822 and loaded onto the computer-readable tangible storage device 818.

The user computing device 120 also includes a network adapter or interface 820, such as a TCP/IP adapter card or wireless communication adapter (such as a 4G wireless communication adapter using OFDMA technology). The apps and programs 832 and the user environment definitions 834 can be downloaded the user computing device 120 from an external computer or external storage device via a network (for example, the Internet, a local area network, a wide area network, or a wireless network) and network adapter or interface 820. From the network adapter or interface 820, the apps and programs 832 and the user environment definitions 834 are loaded into computer-readable tangible storage device 818. The network may comprise copper wires, optical fibers, wireless transmission, routers, firewalls, switches, gateway computers and/or edge servers.

The user computing device 120 also includes a touch screen 826, a camera 836, sensors 828, for example, touch screen sensors and magnetically sensitive circuits, and device drivers 824 to interface to touch screen 826 for imaging, to sensors 828 for pressure sensing of alphanumeric character entry and user selections and for detecting magnetic flux and polarity. The device drivers 824, R/W interface 822 and network adapter or interface 820 comprise hardware and software (stored in computer-readable tangible storage device 818 and/or ROM 814).

It should be appreciated that FIG. 7 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

Figure 8:
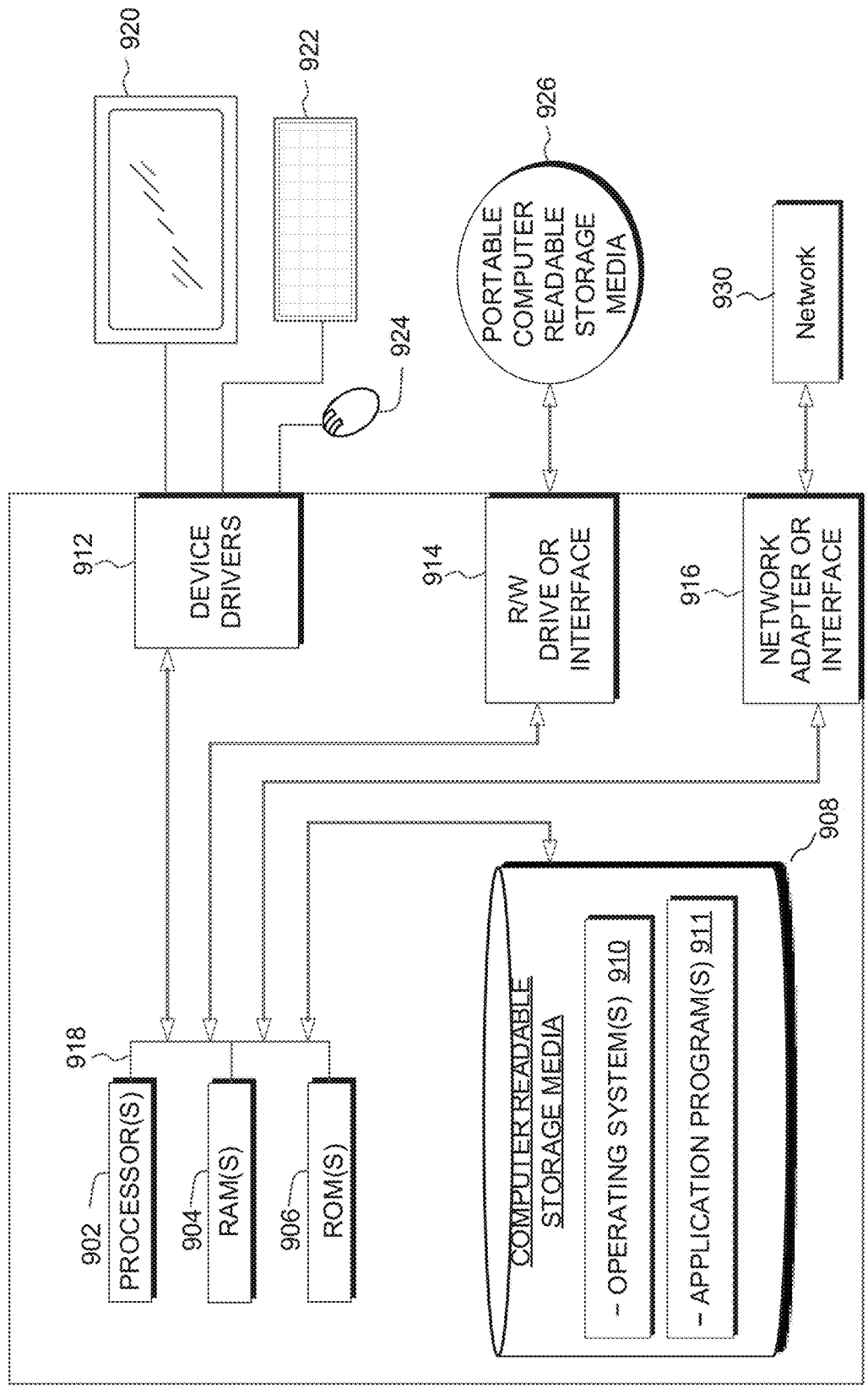
FIG. 8 is a block diagram of components of a computing device of the system for cataloging images based on a gridded color histogram analysis of FIG. 1, in accordance with embodiments of the present invention.

FIG. 8 depicts a block diagram of components of the user computing device 120 and/or the server 130 of the system for cataloging images based on a gridded color histogram analysis 100 of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

The user computing device 120 and/or the server 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, color histogram based image catalog manager module 140 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user computing device 120 and/or the server 130 may also include a R/W drive or interface 914 to read from and write to one or more portable computer readable storage media 926. Application programs 911 on the user computing device 120 and/or the server 130 may be stored on one or more of the portable computer readable storage media 926, read via the respective R/W drive or interface 914 and loaded into the respective computer readable storage media 908.

The user computing device 120 and/or the server 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the user computing device 120 and/or the server 130 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The user computing device 120 and/or the server 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
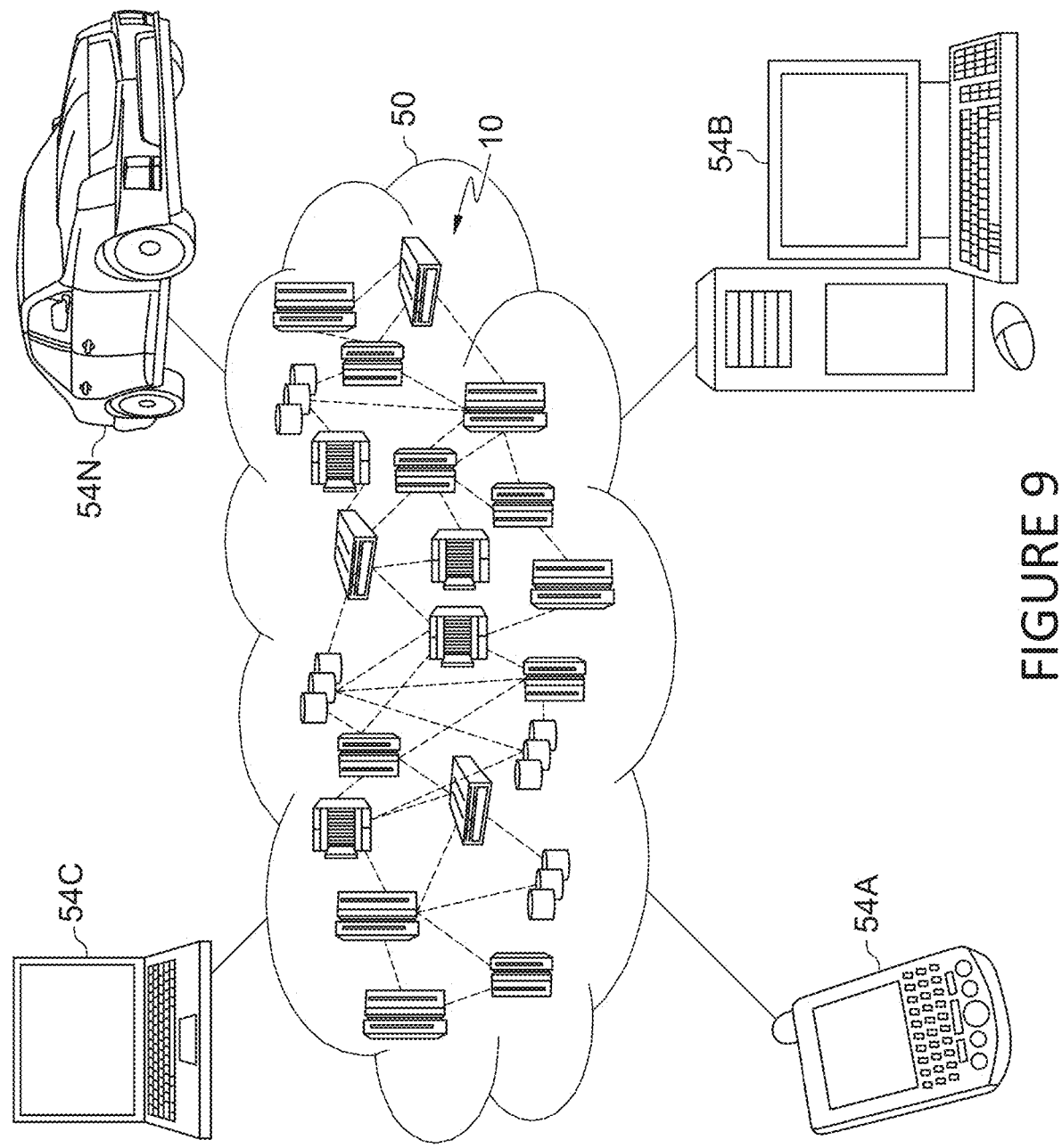
FIG. 9 depicts a cloud computing environment according to an embodiment of the present invention.
Figure 10:
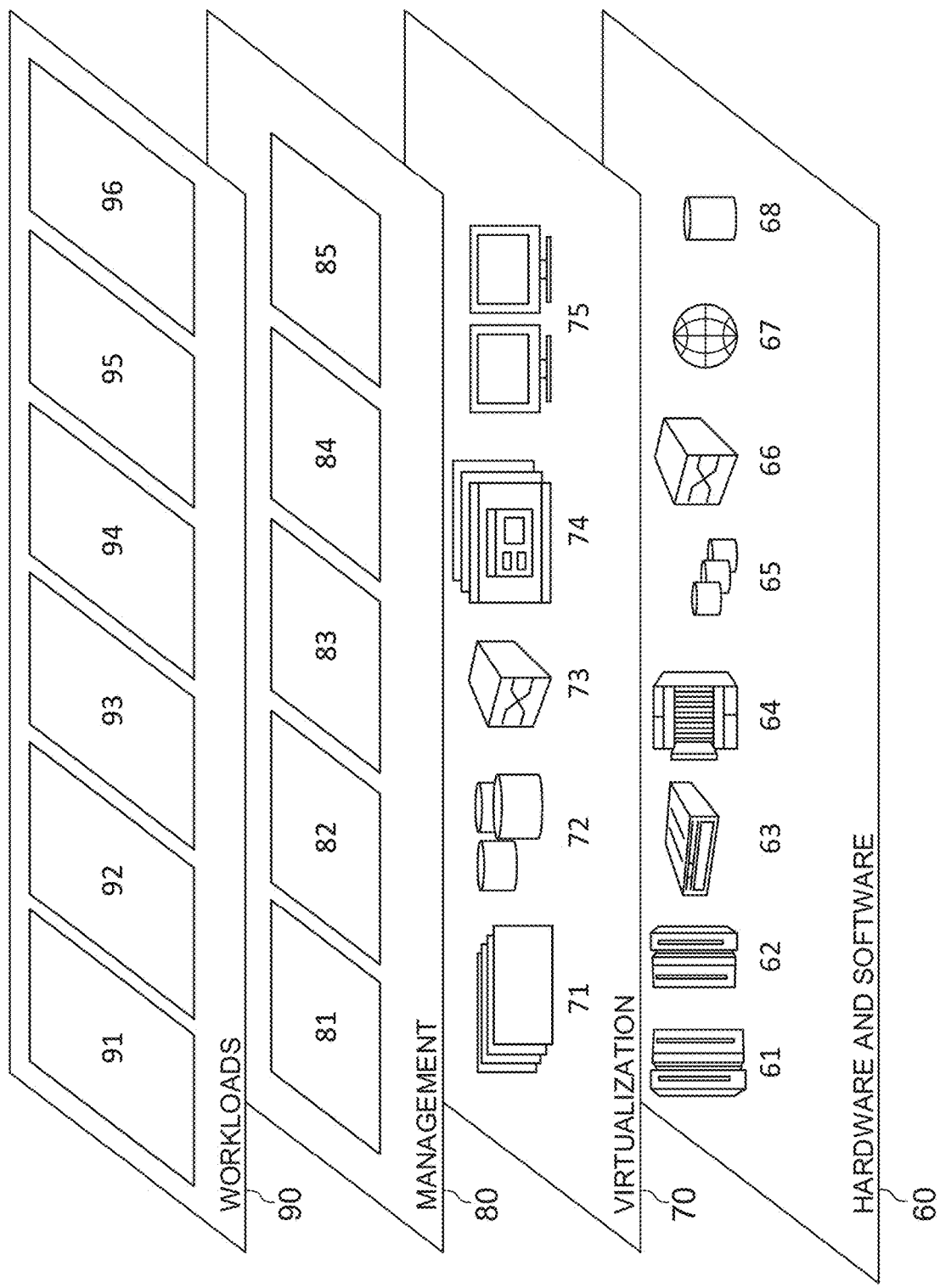
FIG. 10 depicts abstraction model layers according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the color histogram based image catalog manager module 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method comprising:
    accessing, by a computer, an image gallery specified by a user;
    receiving, by the computer, a request to search the image gallery;
    performing, by the computer, a search of the image gallery, wherein the search is using a color based histogram algorithm based on a user input, wherein the user input includes:
        receiving a selected region on a gridded template and a selected color combination, or
        receiving a selected color on a region of a sample image, and
    wherein the color based histogram algorithm includes:
        averaging at least one pixel of the selected color combination on the selected region, or
        averaging at least one pixel of the selected color on the region of the sample image;
    cataloging, by the computer, a plurality of images from the search of the image gallery using the color based histogram algorithm; and
    transmitting, by the computer, a cataloged and sorted image gallery to the user computing device to be displayed.

2. The method of claim 1, further comprises:
    analyzing, by the computer, the image gallery for at least one similar image, wherein the at least one similar image is similar in the selected color combination on the selected region; or
    analyzing, by the computer, the image gallery for at least one similar image, wherein the at least one similar image is similar in the selected color on the region of the sample image.

3. The method of claim 2, further comprises:
    sorting, by the computer, the image gallery based on a plurality of results from analyzing the image gallery, wherein the sorted image gallery is sorted by similarity among the images.

4. The method of claim 3, further comprises:
    cataloging, by the computer, the sorted image gallery, wherein the cataloged and sorted image gallery begins with a most similar image.

5. The method of claim 1, further comprises:
    receiving, by the computer, a user profile, wherein the user profile contains a plurality of personal characteristics and a plurality of profile settings; and
    receiving, by the computer, at least one sampling rule from the user, wherein the at least one sampling rule can be chosen from a plurality of predetermined sampling rules or be made by the user.

6. The method of claim 5, wherein the search is using a color based histogram algorithm based on a user input, is further based on the user profile and the at least one sampling rule from the user to customize the request to search the image gallery.

7. The method of claim 1, further comprises:
    extracting, by the computer, a plurality of color histogram information based on a gridded pattern from a plurality of images in the image gallery, wherein the plurality of color histogram information is used in the request to search the image gallery.

8. A computer program product comprising:
    one or more non-transitory computer-readable storage media and program instructions stored on the one or more non-transitory computer-readable storage media, the program instructions comprising:
        accessing an image gallery specified by a user;
        receiving a request to search the image gallery;
        performing a search of the image gallery, wherein the search is using a color based histogram algorithm based on a user input, wherein the user input includes:
            receiving a selected region on a gridded template and a selected color combination, or
            receiving a selected color on a region of a sample image, and
        wherein the color based histogram algorithm includes:
            averaging at least one pixel of the selected color combination on the selected region, or
            averaging at least one pixel of the selected color on the region of the sample image;
        cataloging a plurality of images from the search of the image gallery using the color based histogram algorithm; and
        transmitting a cataloged and sorted image gallery to the user computing device to be displayed.

9. The non-transitory computer program product of claim 8, further comprises:
    extracting a plurality of color histogram information based on a gridded pattern from a plurality of images in the image gallery, wherein the plurality of color histogram information is used in the request to search the image gallery.

10. The non-transitory computer program product of claim 8, further comprises:
    analyzing the image gallery for at least one similar image, wherein the at least one similar image is similar in the selected color combination on the selected region; or
    analyzing the image gallery for at least one similar image, wherein the at least one similar image is similar in the selected color on the region of the sample image.

11. The non-transitory computer program product of claim 10, further comprises:
    sorting the image gallery based on a plurality of results from analyzing the image gallery, wherein the sorted image gallery is sorted by similarity among the images.

12. A computer system comprising:
    one or more computer processors, one or more computer-readable storage media, and program instructions stored on one or more of the computer-readable storage media for execution by at least one of the one or more processors, the program instructions comprising:
        accessing an image gallery specified by a user;
        receiving a request to search the image gallery;
        performing a search of the image gallery, wherein the search is using a color based histogram algorithm based on a user input, wherein the user input includes:
            receiving a selected region on a gridded template and a selected color combination, or
            receiving a selected color on a region of a sample image, and
        wherein the color based histogram algorithm includes:
            averaging at least one pixel of the selected color combination on the selected region, or
            averaging at least one pixel of the selected color on the region of the sample image;

cataloging a plurality of images from the search of the image gallery using the color based histogram algorithm; and transmitting a cataloged and sorted image gallery to the user computing device to be displayed.

13. The computer system of claim 12, further comprises:

analyzing the image gallery for at least one similar image, wherein the at least one similar image is similar in the selected color combination on the selected region; or analyzing the image gallery for at least one similar image, wherein the at least one similar image is similar in the selected color on the region of the sample image.

14. The computer system of claim 13, further comprises:

sorting the image gallery based on a plurality of results from analyzing the image gallery, wherein the sorted image gallery is sorted by similarity among the images.

* * * * *